United States Patent Office 3,430,239
Patented Feb. 25, 1969

3,430,239
DOPPLER INERTIAL SYSTEM WITH ACCURATE VERTICAL REFERENCE
Heinz Buell, Mount Kisco, N.Y., John M. Fiore, Elizabeth, N.J., and Louis S. Marino, Yorktown Heights, and Jack Rubin, Brooklyn, N.Y., assignors to General Precision Systems Inc., a corporation of Delaware
Filed July 19, 1967, Ser. No. 654,502
U.S. Cl. 343—9     16 Claims
Int. Cl. G01s 9/44

ABSTRACT OF THE DISCLOSURE

An in-flight gyrocompassing system is provided, including a heading reference system (FIG. 1) employing a two degree of freedom gyroscope 40 on table 14 together with a two-axis accelerometer 42. A North axis signal from accelerometer 42 is the major input to a gyrocompassing circuit 76. The operation of circuit 76 is tuned and damped by a signal $V_{dn}$ derived from the Doppler radar 48. Electrical compensation for leveling errors of table 14 about the North axis is provided by the compensating circuit 104, the operation of which is tuned and damped by a Doppler velocity signal $V_{de}$. Very accurate vertical reference signals are provided at a location remote from the heading reference system of FIG. 1, despite airframe flexture, by the vertical reference system of FIG. 2. The FIG. 2 system includes an inertially stabilized table 126 and associated stabilization circuits 162 and 164, the operation of each of which is corrected and damped by Doppler velocity signals obtained from the Doppler radar 48 of FIG. 1.

Brief description of the invention

This invention relates to navigation systems which are particularly useful for producing navigation and attitude information for aircraft, and which employ a combination of Doppler radar and inertial elements in a new and more efficient combination. In particular, it includes radar equipment which is capable of measuring velocity of the craft.

Description of the prior art

Various navigation data systems have been proposed previously which employ combinations of inertial elements and Doppler radar sets for measuring craft velocities and direction. For instance, systems of this type are disclosed in prior U.S. patents as follows: 2,914,763—Greenwood et al., issued Nov. 4, 1959; and 3,028,592—Parr et al., issued Apr. 3, 1962, each entitled "Doppler Inertial Navigation Data System."

Doppler radar systems are usually arranged to transmit two or more beams of radiant energy from the vehicle at different angles and to receive a portion of the energy after reflection from the earth. Motion of the vehicle relative to the earth causes the frequency of the received energy to deviate from that of the transmitted energy, and by measuring and comparing the frequency shifts of the various beams, the ground speed and the drift angle (the angle between the horizontal projections of the velocity vector and the longitudinal axis) of the vehicle can be determined. The nature of the reflection process causes the frequency of the returned signal to fluctuate rapidly and erratically thus leading to large errors in the instantaneous indications of ground speed and drift angle. However, Doppler systems are capable of very high accuracy if the data be averaged over a period of, say, several minutes, and the accuracy does not deteriorate with the passage of time.

Inertial systems may comprise a gyroscopically stabilized horizontal platform on which are mounted two accelerometers so that they measure accelerations in orthogonal directions in the plane of the platform. The accelerations so measured can be integrated to obtain velocities which can in turn be resolved to determine ground speed and drift angle. The accuracy of such systems depends, among other things, upon the horizontality of the platform since the accelerometers cannot distinguish between accelerations caused by motion of the vehicle relative to the earth and the acceleration due to gravity. Even if the platform originally were erected to exact horizontality it would deviate therefrom after a time because of the inherent random drift of the gyroscopes used for stabilization. Inertial systems as above described are thus seen to have the disadvantage that their accuracy deteriorates rapidly with the passage of time although the instantaneous, or short time, accuracy is excellent.

Doppler and inertial systems are thus seen to have complementary advantages, that is, the former has excellent long term accuracy while the latter has excellent short term accuracy. Stated another way, Doppler systems have good response to low frequency fluctuations of input data while inertial systems have good response to high frequency fluctuations of input data. One factor affecting the accuracy of both systems is the need for accurate knowledge of the vertical direction. This knowledge is required in Doppler systems in order to determine the angular position of the transmitted beams, although recent developments in the art of linear array antennas have relaxed the requirements somewhat. In the case of inertial systems there is a stringent requirement for knowledge of the vertical because the platform must be exactly horizontal if the accelerometers are not to interpret the acceleration of gravity as a horizontal acceleration.

It has been proposed in the past to combine Doppler and inertial components and it has been found that a composite system not only utilizes fully the advantages of each system but in addition yields greater accuracy in the crossover region than can be obtained with either system alone.

Doppler-inertial navigation systems are usually expected to provide not only very accurate heading and velocity data for navigation purposes, but also a very accurate vertical reference. The expression "vertical reference" and "vertical reference data," as used in this specification, refers to the problem of determining very accurately the orientation which represents an exact vertical vector. As will be described more fully below, this may be determined by maintaining a reference table perfectly horizontal. Such vertical data is often required for the accurate operation of auxiliary equipment such as aerial cameras, terrain-following systems, bomb sights, and fire control systems. It has been found that if the apparatus requiring the accurate vertical reference is located in a position remote from the navigation system, then the vertical data supplied by the navigation system does not accurately represent the vertical direction at the position of the apparatus. This is because of factors such as physical flexure and deformation of the airframe between the location of the navigation system and the apparatus.

It is an important object of the present invention to overcome the problem of inaccuracies in vertical reference signals at the vertical data utilization apparatus due to the combination of physical separation from the vertical reference data source and airframe flexure.

It is another object of the present invention to provide a system having an improved vertical reference source which overcomes the problem of inaccuracies arising from airframe flexure, and which includes the advantages of the accuracy of the combined Doppler-inertial system.

It is another object of the present invention to provide an improved Doppler-inertial navigation data system incorporating an improved vertical reference at minimum cost and with a minimum in complexity.

Another object of the present invention is to provide an improved Doppler-inertial navigation data system incorporating an accurate vertical reference in which the vertical reference is controlled and damped by Doppler velocity signals.

An important feature of the invention involves the provision of a separate vertical reference unit which is arranged to be mounted in poximity to the vertical data utilzation apparatus in a position which may be remote from the remainder of the Doppler-inertial navigation system.

Further objects, advantages, and features of the invention will be apparent from the following description and the accompanying drawings.

Summary of the invention

In carrying out the invention in a preferred form thereof, there is provided a Doppler-inertial navigation system including a heading reference unit and a navigational Doppler radar arranged to be mounted in close proximity to one another within an aircraft. Electrical circuits are provided interconnecting the heading reference unit and the radar and operable in conjunction therewith for generating signals indicative of aircraft heading and velocity. At least one separate vertical reference unit is provided and arranged to be mounted remote from the heading reference unit at a location requiring accurate vertical reference signals. The vertical reference unit includes an inertial system with associated circuits for determining an accurate vertical, and connections to receive coordinate Doppler-velocity signals from the radar for control and damping of the vertical inertial system.

Description of the preferred embodiment

Figure 1:
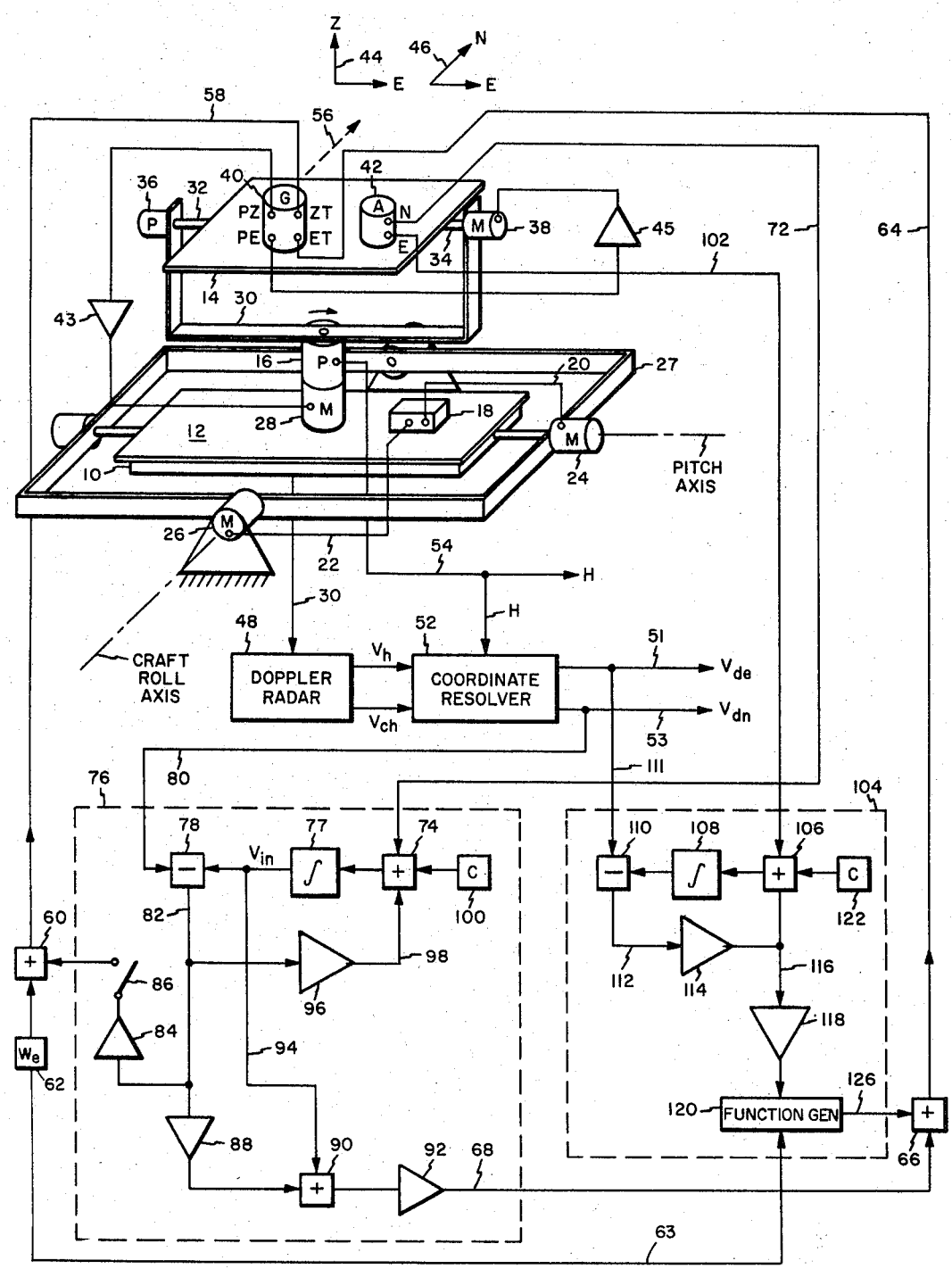
FIG. 1 is a schematic circuit diagram of the heading reference unit and Doppler radar and associated circuitry portions of a preferred system in accordance with the present invention.

Referring more particularly to FIG. 1 of the drawings, there is shown a Doppler radar antenna 10 mounted upon a horizontally stabilized platform 12. A reference table 14 for the inertial guidance elements of the system is mounted by means of a two gimbal arrangement upon the antenna platform 12. The system, including the inertial elements mounted upon the inertial reference table 14, is effective to cause the table 14 to be continuously gyrocompassed in azimuth to maintain an alignment towards North, while the antenna platform 12 remains aligned with the axis of the aircraft. A pickup transducer 16 continuously measures the angle between platform 12 and table 14. The resultant signal is an accurate measurement of the heading of the aircraft in relation to North. While the system also provides complete velocity data, (as will be more fully described below) the accurate heading signal provided by device 16 is regarded as one of the most vital and important outputs of the system.

The antenna platform 12 is maintained in a horizontally stabilized position by means of vertical reference signals which may be obtained from a level detector device 18 of conventional construction. These leveling signals are available through connections 20 and 22 to leveling servomotors 24 and 26. However, it is one of the features of this invention that the antenna platform need not be stabilized in the level position with extreme accuracy, and accordingly, vertical reference signals from another source remote from the platform 12 are adequate for this leveling operation.

Servomotors 24 and 26 form parts of a two gimbal mounting for platform 12, which includes a gimbal ring 27. The shafts of motors 24 and 26 are respectively parallel to the pitch and roll axes of the craft. For practical purposes, they may be considered as coincident with the pitch and roll axes of the craft.

The mounting for the reference tabe 14 upon the antenna platform 12 includes an azimuth positioning motor 28, and the pickup device 16, the stators of which are fastened together and mounted upon the antenna platform 12. The rotors of these elements are fastened together to a shaft which supports a gimbal ring 30. For additional stability, the gimbal ring 30 also has a pivotal connection at its upper end which is fixed with relation to the antenna platform 12. However, this upper end pivot connection and the upper portion of the gimbal ring 30 are omitted from the drawing for purposes of clarity. The motor 28 is normally caused to rotate the gimbal ring 30 in azimuth so as to maintain the position of the gimbal ring 30 in a plane generally perpendicular to the North direction.

Pivotally mounted upon the gimbal ring 30 there are co-axial shafts 32 and 34 which directly support the reference table 14. The shaft 32 may form the rotor shaft of a synchro-pickup device 36, the stator of which is rigidly mounted to the gimbal ring 30. The shaft 34 is the rotor shaft of a motor 38, the stator of which is rigidly connected to the gimbal ring 30. The mutual axis of shafts 32 and 34 is generally maintained in an East-West alignment (hereinafter referred to simply as the East axis), and the motor 38 is usually energized as needed to rotate the shaft 34 and the reference table 14 to maintain table 14 horizontal with respect to the East axis, even though the antenna platform 12 may not be maintained perfectly horizontal.

Since no third gimbal is provided for the reference table 14, no final correction of the level of the reference table 14 for deviations about the North axis is available. It is one of the most important features of this invention that the need for physical North axis corrections is avoided by detecting the magnitude of the North axis leveling error and introducing electrical corrections for this error in lieu of physically correcting the position of the reference table 14. This simplification of the system does not interfere with the accuracy attainable by the navigation data system, and the system is capable of accurate "in-flight" gyrocompassing despite the simplification of the system described here.

The inertial sensing devices attached to and supported upon the reference table 14 inclue a two-axis, two degree of freedom, gyroscope 40, and a two axis accelerometer 42. The gyroscope 40 is responsive to rotational displacements about a vertical axis, (sometimes also referred to herein as the azimuth or Z axis) and to rotational displacements about an East axis, as indicated symbolically by the vectors at 44. The accelerometer 42 is responsive to accelerations along the North axis, and to accelerations along the East axis, as symbolically illustrated by the vectors at 46. It will be understood that two gyros, each having a single degree of freedom, may be substituted for the single two degree of freedom gyro 40, and two single axis accelerometers may be substituted for th accelerometer 42.

The accelerometer 42 provides signals at output connections for North accelerations and East accelerations respectively indicated in the drawing as N and E. The use of these accelerometer signals in the system will be described more fully below. Similarly, the gyroscope 40 provides pickup output signals for rotational displacement errors about the azimuth axis and about the East axis respectively indicated at PZ and PE. Torquing input signals are applied to the gyro 40 for azimuth axis and easterly axis rotations at the respective input terminals ZT and ET. The azimuth output signal is applied through an amplifier 43 to control the table azimuth positioning motor 28. The east axis gyroscope output signal is applied through an amplifier 45 to control the table East axis positioning motor 38.

The Doppler radar portion of the system is indicated schematically by the box at 48 connected at 50 to the antenna 10. This radar set may correspond to radar sets which have been used in prior systems. It may, for instance, employ three or more radar beams, with two beams aimed downwardly ahead of the aircraft on each side of it, and with one or two beams directed downwardly to the rear of the aircraft, on one or both sides. Comparison of the frequencies of the transmitted signals and the echo signals reflected back from the ground for the various beams provides an accurate indication of aircraft velocity and direction, particularly when averaged out over a period of time to compensate for irregularities in the terrain. For a more complete description of a radar set which is satisfactory for use in the present invention, reference is made to the disclosure contained in U.S. Patent 3,028,592, Parr et al., previously referred to above. The Doppler radar set 48 is capable of providing output signals which are an accurate indication of the velocity $V_h$ of the aircraft along the aircraft heading direction, and of the velocity $V_{ch}$ indicative of the component of aircraft velocity in the cross heading direction (perpendicular to the direction of aircraft heading). The radar system is also capable of providing other important information, such as vertical velocity of the aircraft, which is not necessarily pertinent to the description of the present invention, and which consequently is not dealt with here.

The heading and cross heading signals from the Doppler radar 48 are connected to a coordinate resolver apparatus 52 which is operable to convert the heading and cross heading velocity information $V_{dn}$ and $V_{de}$ (Doppler-North, and Doppler-East velocities) respectively indicated at connections 53 and 51. In order to accomplish this purpose, the coordinate resolver 52 must also be provided with an accurate heading H signal indicated at 54, from the heading synchro 16. It will be recalled that this heading signal gives an indication of the angle between the aircraft heading and true North. The function of the coordinate resolver 52 may be carried out by a digital computer, and the digital computer may be one which is also used for other purposes in the aircraft. The Doppler radar system sometimes may be referred to hereinafter as including the coordinate resolver 52.

The method of determining compass directions by gyrocompassing consists basically in sensing the earth's rotation about its North-South axis to thereby determine the direction of North (or South). Gyrocompassing is most easily performed from a position which is stationary with respect to the earth. However, accurate "in-flight" gyrocompassing may be accomplished with apparatus in accordance with the present invention.

The gyro 40 is oriented with its spin axis 56 pointed towards North, after the system has reached equilibrium. Because a gyro inherently maintains its attitude stabilized absolutely in space, in order to maintain the spin axis 56 of the gyro 40 pointing in a northerly direction, the gyro must be "torqued" by an input signal on the azimuth axis to compensate for the continuous rotation of the earth, and to compensate for any East component of vehicle velocity, each of which tends to require that the spin axis of the gyro be turned in absolute orientation in order to continue to point North. These torquing correction signals about the azimuth axis are supplied through the torquing input connection ZT of the gyro 40 from a conductor 58. These signals are supplied from a suitable correction circuit 62 through an adding circuit 60. Similarly, the gyro 40 must be continuously torqued about its East axis by a function which is proportional to the North velocity of the craft in order to compensate for the North-South curvature of the earth to keep the table 14 horizontal about the East axis. This correction is applied to the East torquing input ET of gyro 40 through a conductor 64, adding circuit 66, and conductor 68, from a gyrocompassing circuit 76. As previously mentioned, the table 14 is positioned about the azimuth and East axes in response to output signals at PZ and PE from the gyro 40 by means of the amplifiers 43 and 45 and positioning motors 28 and 38.

As long as the table 14 and the gyro 40 are aligned with the gyro axis 56 at true North, the East axis will be aligned to true East and the East input axis is therefore insensitive to East component velocities. Therefore, the regular North velocity compensation provided by circuit 76 is quite adequate for maintaining the table 14 level about the East axis without any requirement for correction on account of easterly velocities due either to the rotation of the earth or to easterly velocity of the vehicle with relation ot the surface of the earth. However, if the table 14 is not perfectly aligned with axis 56 to the North, then the East axis will be out of alignment also, with the result that true East velocities appear to have a North-South component which is coupled into the disoriented East input axis of the gyro 40. This will include an apparent North component velocity due to the eastward rotation of the earth. None of these "apparent" North velocity components are compensated for by the regular North velocity compensation signals of circuit 76. The result is that the table 14 is no longer perfectly stabilized to a horizontal position about the East axis by the torquing signals applied through connection 64 to the ET terminal of gyro 40. Therefore, the continuance of an error in azimuth alignment of table 14 will cause an accumulation of error in leveling of the table 14 about the East axis. The deviation of the table from the horizontal position about the East axis results in a gravity signal on the North axis of the accelerometer 42.

The North axis accelerometer signal appears on the N terminal of the accelerometer and is supplied through connection 72 to an adding circuit 74 within the gyrocompassing circuit 76. The North axis accelerometer signal consists of a combination of an acceleration signal due to any acceleration in the Northerly direction plus the North axis gravity signal due to any tilting of the table 14 about the East axis. The accelerometer signal received by adding circuit 74 is directed to an integrating circuit 77 to provide a signal equivalent to velocity. This may be referred to as an inertially determined North velocity $V_{in}$. The output $V_{in}$ from the integrator 76 is connected to a comparison circuit 78. Through connection 80, the North Doppler velocity $V_{dn}$ is also provided to comparison circuit 78. By means of comparison circuit 78, the true North velocity as determined by the Doppler radar is subtracted from the combination of North velocity and integrated accelerometer gravity signal derived from the accelerometer 42 through the integrator 76. The difference which appears at the comparison circuit output connection 82 represents the integrated gravity signal only, and this is a measure of the tilt of the table 14 about the East axis. This error is amplified in an amplifier 84, and is supplied through a switch 86 (when the switch is closed) and the adding circuit 60 to torque the gyro about the azimuth axis to thereby re-align table 14 to re-aim the spin axis 56 of the gyro 40 to true North. The error signal at 82 is also supplied through a path including an amplifier 88, an adding box 90, and an amplifier 92 to the East troquing circuit including connection 68, adding box 66 and conductor 64. Thus, the error signal is caused to torque the gyro 40 about the East axis to re-establish the horizontal position of the table 14.

The so-called "regular" North velocity compensation from circuit 76 is proportional to North velocity expressed in terms of radians of rotation about the earth. This signal is supplied through the adding circuit 90 and the amplifier 92 by means of a connection 94 which carries the inertially determined East velocity signal $V_{in}$ to the adding circuit 90.

The error signal at connection 82 is also supplied through an amplifier 96 in a stabilizing feedback connection at 98 to the adding circuit 74 so as to maintain stable operation of the circuit. As is well known in the art of inertial guidance systems, the outputs of accelerometers must be corrected for "Coriolis" errors whenever they are operated in an earth-fixed coordinate system. An appropriate "Coriolis" correction is applied in the gyrocompassing circuit 76 by means of a Coriolis circuit schematically indicated at 100 feeding into the adding box 74.

When starting up the system, and commencing the gyrocompassing operation, the switch 86 in the azimuth correction circuit may be left open so that fast initial leveling about the East axis may be achieved. The switch 86 may then be closed and kept closed for the remainder of the operation of the system in order to provide automatic gyrocompassing as described above. The closure of switch 86 may be accomplished by an automatic time delay means (not shown).

The above description of the system assumes that the table 14 has been perfectly stabilized in a horizontal position with respect to the North axis. However, this condition does not exist because of the fact that the table 14 is mounted upon a two gimbal system which does not have a gimbal pivoted about the North axis. Accordingly, tilting of the table 14 about the North axis is detected by the East accelerometer output, and the system is electrically compensated for such displacement. For this purpose, the East accelerometer output on terminal E of accelerometer 42 is supplied through a connection 102 to a North axis tilt compensating circuit 104. This circuit derives an electrical tilt correction signal which is supplied through the output connection 126, and through the adding circuit 66 to appropriately modify the East torquing signal supplied to the gyro through connection 64.

Within the circuit 64, the East accelerometer signal from connection 102 is applied through an adding circuit 106 to an integrator 108 and thus to a comparison circuit 110. The East accelerometer output includes a combination of signals due to actual East axis accelerations of the craft plus a gravity term due to tilt of the table 14 about the North axis. The comparison circuit 110 is connected at connection 111 to receive the Doppler East velocity signal $V_{de}$ from the resolver 52, and is operable to subtract the Doppler East velocity signal from the integrated signal received from the integrator 108. The difference signal at the output 112 of comparison circuit 110 represents the portion of the output of integrator 108 which is due to a gravity signal component from the East accelerometer. This error signal is modified in the amplifier 114 and is fed back at connection 116 to the input adding circuit 106 for the purpose of stabilizing the system. The signal at 116 is also passed through appropriate amplifiers 118 and 120 which convert the error signal to terms appropriately representative of the required tilt correction function at connection 126. The East accelerometer output is corrected for Coriolis by means of an appropriate circuit schematically indicated at 122 feeding into the adding box 106.

The cause of the error in the East torquing signal resulting from tilt of the table 14 away from the horizontal about the North axis is as follows:

Under such conditions, the East axis of the gyro 40 is tilted away from the horizontal. Accordingly, it may be said to have a vectorial component of input about the vertical or azimuth axis. With respect to this vertical component of its input, it requires an earth rate correction similar to the correction applied to the azimuth gyro input from the circuit 62 as previously described above. However, this is only a fractional correction proportional to the trigonometric "sine" function of the angle of displacement from the horizontal. This correction factor is generated within the circuit 120 and may be expressed as follows:

$$\left( W_e \sin L + \frac{V_e}{R} \tan L \right) \sin U_n$$

where:

$W_e$=earth's rate of rotation
L=latitude
$V_e$=East velocity of the craft
R=radius of the earth
$U_n$=the angle of (tilt) about North axis.

The portion of the above expression within the parentheses represents the earth rate correction applied by circuit 62 to the azimuth torquing input of gyro 40. The circuit 120 may conveniently obtain this function by an interconnection with circuit 62 indicated generally by reference character 63.

The tilt correction factor from circuit 120 may be considered as only a first order correction. However, this correction is quite adequate in the preferred form of the invention in which the two gimbal supporting structure for table 14 is itself supported upon the antenna platform 12. This is because the antenna platform itself is stabilized at a reasonably level position by a coarse leveling system. The form of the system which is disclosed in the specification and in the drawing of FIG. 1 including the feature of mounting table 14 upon the platform 12 is the preferred form. However, it is within the scope of the present invention to employ a two gimbal mounting for the inertial system reference table 14 in which the mounting is not necessarily supported upon a horizontally stabilized system. In such a situation, the correction signals derived from the circuit 104 to compensate for rotational displacements away from the horizontal about the North axis 56 may be anticipated to be greater. Furthermore, if a high degree of system accuracy is required, more elaborate correction signals of higher order my be necessary to compensate for such deviations from level.

It is one of the most important features of the present invention that apparatus located anywhere within the craft may be provided with an extremely accurate local vertical reference. The term "vertical reference," as used herein, is meant to signify a set of signals indicating the deviation of the craft from a perfectly level position. By locating the source of the vertical reference signals physically adjacent to the apparatus requiring those signals, it is assured that factors such as flexure of the structure of the craft will not cause a serious inaccuracy because of deviation between the true vertical at the point of utilization and at the point of generation of the signals.

Figure 2:
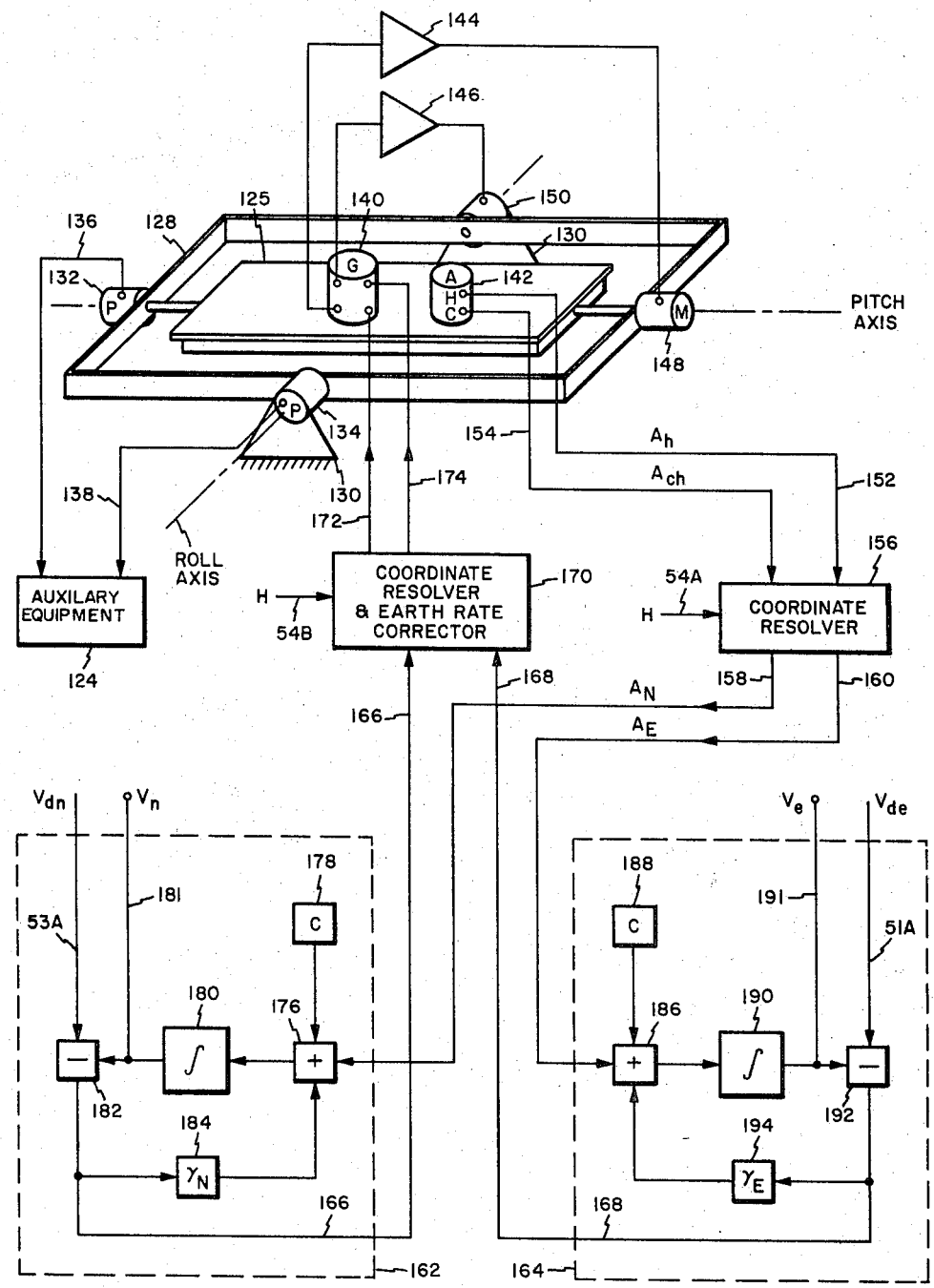
FIG. 2 is a schematic diagram of a vertical reference unit and associated circuitry comprising a portion of the preferred embodiment of the system in accordance with the present invention which is intended to be mounted at a position separated from the apparatus shown in FIG. 1.

FIG. 2 shows the portion of the system including the vertical reference signal generator located remotely from the remainder of the Doppler inertial system as described in connection with FIG. 1. The box 124 schematically indicates equipment requiring accurate vertical signals. This equipment may consist of an aerial mapping camera, a bomb sight, fire control equipment, or other apparatus which must be accurately aimed and stabilized.

The local source of accurate vertical signals includes an inertial reference table 125 mounted on gimbal ring 128 which is pivoted on supports 130 to form a double gimbal mounting. The inertial table 125 is very accurately stabilized in a perfectly level position by an inertial system which is damped and tuned by Doppler velocity signals derived from the Doppler radar equipment 48 previously described in connection with FIG. 1. The accurate vertical output signals are provided from rotary electromagnetic generators 132 and 134 respectively located at the pivotal mountings of the table 125 to the gimbal 128, and at the mountings of the gimbal 128 at the support 130. These electrical vertical signals are supplied through the electrical connections 136 and 138 to the device 124.

The table 125 is maintained in an accurate horizontal position (providing an accurate "vertical") by means of a two degree of freedom gyro 140 which is torqued in response to signals generated by the associated circuits, the torquing signals from the circuits being derived in large measure from acceleration signals from a two axis accelerometer 142. The output signals of the gyroscope 140 are respectively amplified by amplifiers 144 and 146 and supplied to appropriate servomotors 148 and 150 which are respectively arranged to position the platform 125 about the pitch axis and the roll axis of the craft.

It will be understood that the gyroscope 140, which is sensitive to input signals about both the heading (or roll) axis and about the cross heading (or pitch) axis may be replaced by two single axis input gyros. Similarly, the accelerometer 142 may be replaced by two single axis accelerometers.

The accelerometer 142 is arranged to indicate and measure accelerations $A_h$ along the heading axis, and also accelerations $A_{ch}$ along the cross heading axis by signals on the respective output lines 152 and 154. These signals are connected to a coordinate resolver 156 which is also connected to receive a heading signal H on a connection 54A. This is the same heading signal H which is available on connection 54 in FIG. 1.

The coordinate resolver 156 is effective to derive from the heading and cross heading acceleration signals equivalent North and East acceleration signals which appear on the coordinate resolver output connections 158 and 160. These signals are respectively applied to circuits 162 and 164 where they are integrated and compared with corresponding Doppler signals to derive appropriate error signals. The resultant error signals are provided on connections 166 and 168 to a coordinate resolver and earth rate corrector circuit 170. Circuit 170 converts the errors to heading and cross heading errors (with earth rate corrections), and these error signals are supplied through connections 172 and 174 to the torquing inputs of the gyroscope 140. A heading reference signal from the heading reference signal source connection 54 of FIG. 1 is supplied, as indicated at 54B, to the coordinate resolver circuit 170.

The circuits 162 and 164 respectively receive the Doppler North velocity signal $V_{dn}$ and the Doppler East velocity signal $V_{de}$, as indicated at 53A and 51A from the Doppler system output connections 53 and 51 of FIG. 1. Within the circuit 162, the North accelerometer signal is applied to an adding box 176 where a Coriolis correction factor is also applied from a Coriolis correction circuit 178. The resultant modified acceleration signal is integrated in an integrating circuit 180 to obtain a signal $V_n$ corresponding to North velocity. This signal is compared with the Doppler North velocity signal $V_{dn}$ on connection 53A at the comparison circuit 182. The difference, indicating an error attributable to a gravity term due to lack of a perfectly level condition of the platform 126 then appears on output connection 166 from comparison circuit 182 and from the entire circuit 162. The error signal is also fed back through an appropriate scaler element 184 to the input of the integrator 180 at the adding box 176. This provides a negative feedback or damping signal to maintain system stability, and to correct the velocity signal $V_n$. The velocity signal $V_n$ may be brought out to terminal 181 for optional use in another part of the system as described below.

The circuit of 164 is substantially identical internally to the circuit 162. It includes an adding box 186, a Coriolis corrector 188, an integrator 190 producing an East velocity signal $V_e$, a comparison circuit 192 for comparing $V_e$ with the East Doppler velocity signal $V_{de}$ to provide an appropriate error signal on connection 168. Again, a stabilizing circuit including a scaler element 194 is provided to carry at least a part of the output signal back as a negative stabilizing feedback at the adding box 186. This feedback loop corrects the velocity signal $V_e$, and this velocity signal is brought out to a terminal 191 for optional use as described below.

It will be recognized that the circuits 162 and 164 each have features similar to the circuits 76 and 104 of FIG. 1.

It is one of the important features of the present invention that the computation of error signals within the circuits 162 and 164 is accomplished in North and East coordinates rather than in heading and cross-heading coordinates. By converting to North and East coordinates in the coordinate resolver 156, accomplishing the computations in the North and East coordinates, and then re-converting to heading and cross-heading torquing signals in the resolver 170, the system is made to be insensitive to rate of change of heading. If the entire operation of the circuits was carried out in the heading and cross-heading coordinates, then it would be necessary to provide a rate of change of heading measurement and compensation in order to accomplish accurate earth rate and Coriolis corrections of the system. Considerable additional complexity of the system would result.

Because of airframe flexure in azimuth, the heading signal received at connections 54A and 54B, and the Doppler velocities received at connections 51A and 53A from the heading reference apparatus shown in FIG. 1 may not be accurately related to the true heading at the vertical reference unit of FIG. 2. Thus, there may be an angular displacement of the apparatus of FIG. 2 in azimuth with respect to the apparatus of FIG. 1. However, the heading signals and the Doppler velocity signals need not be absolutely accurately related to the vertical reference unit of FIG. 2 in order to provide accurate vertical output signals. It is a recognized characteristic of Doppler velocity damped inertial navigation systems that errors in the Doppler velocity measurements and the heading do not critically affect the accuracy of the vertical output signals. It is an important feature of the present invention that this inherent characteristic of such systems (relative independence of vertical signal accuracy from heading errors) permits a very accurate vertical system physically separated from the heading reference unit without the necessity for independently generating accurate local heading signals.

In connection with the description of the heading reference of FIG. 1, it was pointed out that vertical signals are required for the horizontal stabilization of the antenna platform 12 by operation of the stabilization motors 24 and 26. The vertical reference signals available on output connections 136 and 138 of the vertical reference unit may be used as leveling signals for this purpose. Thus, the level detection device 18 may be omitted. These signals may not perfectly represent true vertical at the platform 12 because of factors such as flexure of airframe in the presence of substantial physical separation between the units. However, the platform 12 need not be perfectly stabilized, and therefore the resultant error is of no consequence.

The Doppler radar unit 48 is operable to generate instantaneous velocity signals which fluctuate rather rapidly because of the influence of irregularities in the terrain over which the aircraft passes and from which the reflected radar signals are received. While the instantaneous velocity signals may not be particularly accurate, the averaged value of these signals is quite accurate. However, if an averaging or filtering circuit which is highly effective is used, then circuit complexity is increased and the speed of response of the Doppler system output signals to actual changes in coordinate velocities is somewhat reduced.

It is one of the features of the present invention that the Doppler velocity signals are not "averaged" or smoothed appreciably, thus preserving the high speed of response to actual changes in vehicle velocity. Instead of smoothing or averaging the Doppler velocity signals, the instantaneous values are used to compare directly with corresponding intertially derived velocities and to thus provide correction and damping signals for such inertially derived velocities. Since these correction signals are applied only through a reduction scaling damping circuit, the instantaneous fluctuations of the correction and damping signal do not cause appreciable fluctuation in the resultant corrected inertially derived velocity signal. The result of the corrections applied through the damping circuit is cumulative and effectively accomplishes an averaging effect, while avoiding the cost, complexity, and reduction in response which would result from averaging of the Doppler signals prior to comparison with the corresponding intertially derived velocities. The result of the operation of this system is that, for instance, in FIG. 2, accurate and stable coordinate velocity signals $V_n$ and $V_e$ are available at terminals 181 and 191. These velocity component signals represent inertially derived velocities, corrected cumulatively by error signals derived from the respective coordinate Doppler velocity signals. Since they are basically inertially derived signals, these velocity component signals are much more stable than the corresponding Doppler velocity signals. However, they may be correctly characterized as "Doppler-derived" velocity signals since they are corrected from Doppler signals.

Referring back to FIG. 1, the speed of response of the gyrocompassing circuit 76 is limited by the error feedback which is permitted by the feedback scaling circuit 96. The scaling circuit 96 must be designed to permit only a limited feedback of error because of the fact that the error is computed on the basis of the rapdly fluctuating Doppler North velocity on input connection 80. However, in accordance with an alternative feature of this invention, the relatively stable velocity $V_n$ appearing at terminal 181 in FIG. 2 may be connected to the input connection 80 of circuit 76 instead of the Doppler velocity signal $V_{dn}$. Since $V_n$ is much more stable than $V_{dn}$, the feedback scaling circuit 96 may be adjusted to permit a much higher fraction of the computed error signal to be fed back without causing too rapid fluctuations in the instantaneous operation of the circuit, or instability. As a consequence, the response of the gyrocompassing circuit 76 is much improved in speed, and accordingly, more rapidly gyrocompassing is achieved.

In this alternative, the $V_e$ signal from terminal 191 of circuit 164 of FIG. 2 may also be connected to the input connection 111 of circuit 104 of FIG. 1, instead of the Doppler East velocity signal $V_{de}$. The associated feedback loop scaling circuit 114 may then also be adjusted to cause a more rapid correction response in the East velocity loop 104. Thus, the overall speed of response of the gyrocompassing system and the heading reference unit is improved, while at the same time retaining the combined advantages of both inertial and Doppler detection of coordinate velocities.

The circuits shown are preferably supplemented by means for the correction of errors such as gyro drift which are commonly present with inertial systems. It will be understood that this and other conventional refinements are preferably incorporated in the systems in accordance with the present invention.

And, although the heading reference means of FIG. 1 was particularly described in connection with supplying the heading signals on lines 54A, 54B, FIG. 2; this was done merely by way of illustrating a preferred embodiment of the invention. Obviously, any well-known suitable heading reference unit such as, for example, a magnetic compass or a stellar-tracker, may be used instead without departing from the principles of the invention.

Thus, it is apparent that various changes and modifications, in addition to those mentioned above, may be made by those who are skilled in the art without departing from the basic features of the invention. Accordingly, it is the intention of the applicants to protect all variations and modifications within the true spirit and valid scope of this invention.

What is claimed is:
1. A Doppler-inertial navigation system comprising,
a heading reference unit and a navigational Doppler radar arranged to be mounted within an aircraft, said Doppler radar including a platform for supporting a Doppler antenna, said platform being adapted for vertical stabilization and said heading reference unit being mounted upon said platform,
electrical circuits interconnecting said heading reference unit and said radar and being operable in conjunction therewith for generating signals indicative of aircraft heading and velocity,
at least one vertical reference unit arranged to be mounted remote from said heading reference unit and said Doppler radar at a location requiring accurate vertical reference signals,
said vertical reference unit comprising an inertial system including associated circuits for determining an accurate vertical, and
said associated circuits being responsive to heading reference signals from said heading unit and coordinate Doppler velocity signals from said radar for damping and correction of said vertical inertial system.

2. A system in accordance with claim 1 wherein said Doppler velocity signals are converted to North and East coordinates, and
the vertical reference unit correction signals are generated in terms of North and East coordinate corrections to thereby avoid the necessity for inserting corrections for rate of change of heading.

3. A system in accordance with claim 2 wherein said inertial system for said vertical reference unit comprises,
an inertial reference table including a two gimbal mounting having mutually perpendicular horizontal axes for attachment to the aircraft and support thereon,
said system including means responsive to said heading reference unit for converting said North and East correction signals to coordinate signals for rotational correction about the axes of said two gimbal mouting.

4. A system as set forth in claim 3 wherein the vertical signals from said vertical unit are connected to control the stabilization of said antenna.

5. A system as set forth in claim 1 wherein said heading reference unit mounted on said antenna platform includes an inertial reference table having a two gimbal support structure arranged for pivotal adjustment about the vertical and East axes,
said interconnecting circuits for said heading reference unit and said Doppler radar including circuit means for generating electrical corrections for tilting of the heading reference unit about the North axis.

6. A system in accordance with claim 1 wherein said vertical reference unit comprises an inertial reference table having a two gimbal support for mounting to the aircraft and arranged to be aligned horizontally thereon,
first and second gyroscope means and first and second accelerometer means mounted upon said table, circuit means connected to receive signals from said first and second accelerometer means and connected to receive heading and velocity signals from said heading reference unit and being operable to generate torquing signals for said first and second gyroscope means to level said table.

7. A system as set forth in claim 6 wherein said first and second gyroscopic means are combined in a single two degree of freedom gyro which is responsive to rotational in each of two axes.

8. A system in accordance with claim 6 wherein said first and second accelerometer means are combined in a single two axis accelerometer.

9. A system in accordance with claim 1 wherein said vertical reference unit comprises an inertial reference table having a two gimbal support for mounting to the aircraft and arranged to be aligned horizontally thereon, first and second gyroscope means mounted upon said table, said first and second gyroscope means being respectively responsive to rotational displacements about the two axes of said two gimbal supports for said table, said first and second accelerometer means being respective responsive to acceleration signals parallel to the two respective axes of said two gimbal supports for said table, circuit means connected to receive signals from said first and second accelerometer means and connected to receive heading and velocity signals from said heading reference unit and being operable to generate torquing signals for said first and second gyroscope means, and leveling means for said table including positioning motors arranged to rotate said table respectively about said two gimbals and connected and arranged for operation in response to output signals from said two gyroscopic means.

10. A system as set forth in claim 9 wherein said Doppler radar includes a coordinate resolver for providing Doppler North and Doppler East coordinate velocities, and said accelerometer circuit means includes a coordinate resolver operable in response to the accelerometer ouputt signals and the heading signal to derive North and East acceleration signals, means for integrating said North and East acceleration signals and for comparing said integrated signals with the Doppler North velocity and Doppler East velocity signals to derive North and East correction signals, and means for resolving the coordinates of said correction signals, and means for resolving the coordinates of said correction signals to correspond to the coordinates of the two gimbal mounting of said table for proper torquing of said first and second gyroscopic means for leveling said table.

11. A system as set forth in claim 10 wherein said North and East correction signals are respectively connected back through scaling feedback circuits to the inputs of said North and East integrating means to thereby correct the outputs thereof to derive Doppler corrected and stabilized inertial North and East volocities, and wherein said heading reference unit comprises a second inertial reference table, North and East axis accelerometer means mounted upon said second reference table, said electrical circuits interconnecting said heading reference unit and said radar including a gyrocompassing circuit connected to receive signals from said North axis accelerometer means, said gyrocompassing circuit including integrating means for integrating said North axis accelerometer means signal, and comparison means connected to compare said integrated North axis accelerometer means signal with a Doppler derived North axis velocity signal to thereby obtain an error signal for the gyrocompassing operation, said electrical circuits interconnecting said heading reference unit and said radar also including a compensating circuit for receiving signals from said East axis accelerometer means, said compensating circuit including means for integrating the signal from said East axis accelerometer means and a second comparison means connected to compare said integrated East axis accelerometer means signal with a Doppler derived East axis velocity signal to thereby obtain an error signal for compensation of said heading unit for tilting about the North axis, and said gyrocompassing circuit and said compensating circuit each including a scaler feedback circuit connected to transmit each of said last-mentioned error signals back to the inputs of the respective integrating circuits for stabilization and correction thereof.

12. A system in accordance with claim 11 wherein said Doppler derived North and East velocity signals are obtained directly from said navigational Doppler radar.

13. A system in accordance with claim 11 wherein said Doppler derived North and East velocity signals are said Doppler corrected inertial North and East velocity signals.

14. Vehicle navigation apparatus comprising, heading reference means for continuously supplying signals representing the vehicle's instantaneous heading, Doppler radar means for measuring the vehicle's horizontal velocity, said Doppler radar means cooperating with said heading reference means for producing signals representing the measured velocity's components in the true North and true East directions respectively, said Doppler radar means including a Doppler antenna supported by a platform adapted for vertical stabilization wherein said heading reference means is mounted upon said antenna platform, inertial means remotely located from said velocity measuring means for deriving signals indicative of the vehicle's accelerations in the along-heading and cross-heading directions respectively, and for providing an accurate vertical reference information at said remote location, means responsive to said acceleration signals and said heading signals for providing signals representing the vehicle's accelerations along true North and true East directions respectively, circuit means responsive to said last-mentioned signals for integrating said signals to supply indications representing the vehicle's true North and true East velocity components, respectively, circuit means responsive to said last-mentioned signals for integrating said signals to supply indications representing the vehicle's true North and true East velocity components, respectively, comparator means responsive to said true North and true East velocity components obtained from said measuring means and said last-mentioned true North and true East velocity components for developing velocity error signals representing the instantaneous difference therebetween, respectively, said comparator means being coupled to said heading means for converting said velocity error signals into along-heading and cross-heading components, respectively, and means for feeding back said cross-heading and along-heading velocity error components to said inertial means for utilization therein whereby said vertical reference information obtained therefrom is rendered independent of vehicle flexure and bending.

15. Apparatus in accordance with claim 14 wherein said inertial means further includes gyroscopic means for normally maintaining said inertial means horizontal with respect to a local verticle passing through said inertial means and the center of the earth, said feedback means being connected to said gyroscopic means for continuous correction thereof.

16. The apparatus in accordance with claim 14 wherein means are provided for feeding back said vertical reference information to said antenna platform for maintaining an accurate vertical stabilization thereof.

(References on following page)

References Cited

UNITED STATES PATENTS

| | | | |
|---|---|---|---|
| 2,908,902 | 10/1959 | Gray et al. | 343—9 |
| 2,914,763 | 11/1959 | Greenwood et al. | 343—9 |
| 3,068,706 | 12/1962 | Lankow | 235—150.25 X |
| 3,167,763 | 1/1965 | Barkalow et al. | 343—9 |

RODNEY D. BENNETT, JR., *Primary Examiner.*

CHARLES L. WHITHAM, *Assistant Examiner.*

U.S. Cl. X.R.

235—150.25